UNITED STATES PATENT OFFICE.

WILLIAM J. WOODLEY, OF SAN FRANCISCO, CALIFORNIA.

IMPROVEMENT IN MATERIALS FOR FILLING MATTRESSES, &c.

Specification forming part of Letters Patent No. 130,171, dated August 6, 1872.

SPECIFICATION.

I, WILLIAM J. WOODLEY, of the city and county of San Francisco, State of California, have invented a new and useful substance suitable for use in filling mattresses, beds, sofas, chair-seats, and other articles of like nature, and for roofing material, coarse cloth, matting, &c., the following being a specification thereof.

Take the inner fibrous portions of the bark of the cedar tree (*Cedrus pinus*) and cut it into blocks of suitable size for handling. Introduce these blocks beneath suitable stampers or beaters, which will operate to beat the bark into a loose fibrous mass. Take this mass and pass it through a "picker," such as is used for picking wool, only the teeth on the revolving cylinder of the picker will be made stronger than usual, and they may be set a little wider apart. After the mass has been passed through the picker it may be introduced into a sifting-cylinder—that is, a wire-cloth cylinder having coarse meshes. By revolving this cylinder, charged with the fibrous mass as it comes from the picker, the material may be cleaned of dust and dirt.

I merely hint at the above-described suitable process of manufacture; but do not wish to confine myself to this process, for I am aware that many means may be employed to produce the same result. The machinery I do not claim as belonging to my invention.

A patent has been issued to Francis C. Cone for a fibrous substance made from the bark of the redwood tree; but it does not appear that the said Cone knew of the peculiar qualities of the bark of the cedar tree, particularly the species of cedar known in commerce as the Port Orford cedar.

I claim—

As a new article of commerce, the fibrous substance made from the bark of the cedar tree and its various species, as herein described, for the purposes set forth.

WM. J. WOODLEY.

Witnesses:
GEORGE PARDY,
JOHN ALLAN.